United States Patent Office 3,240,537
Patented Mar. 15, 1966

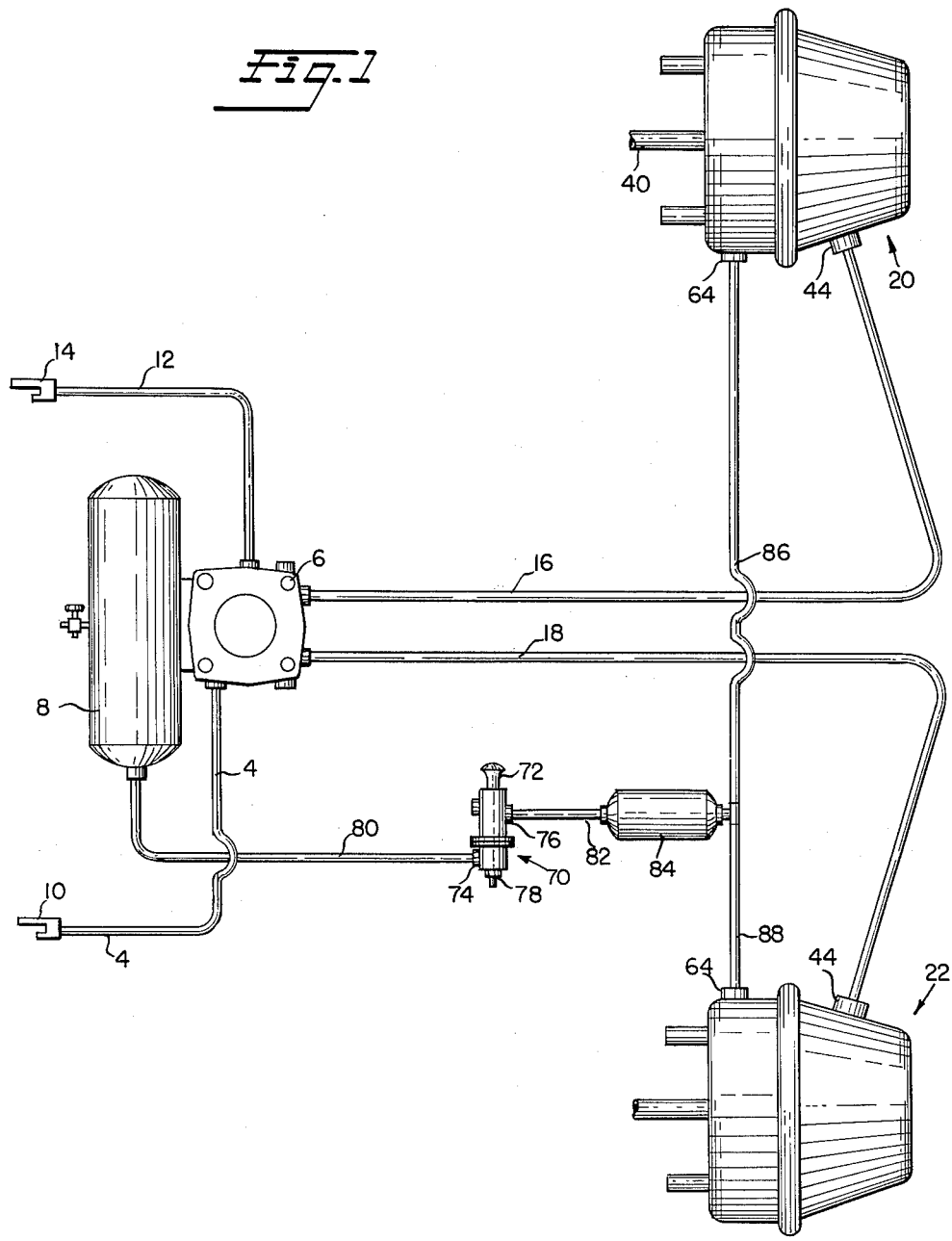

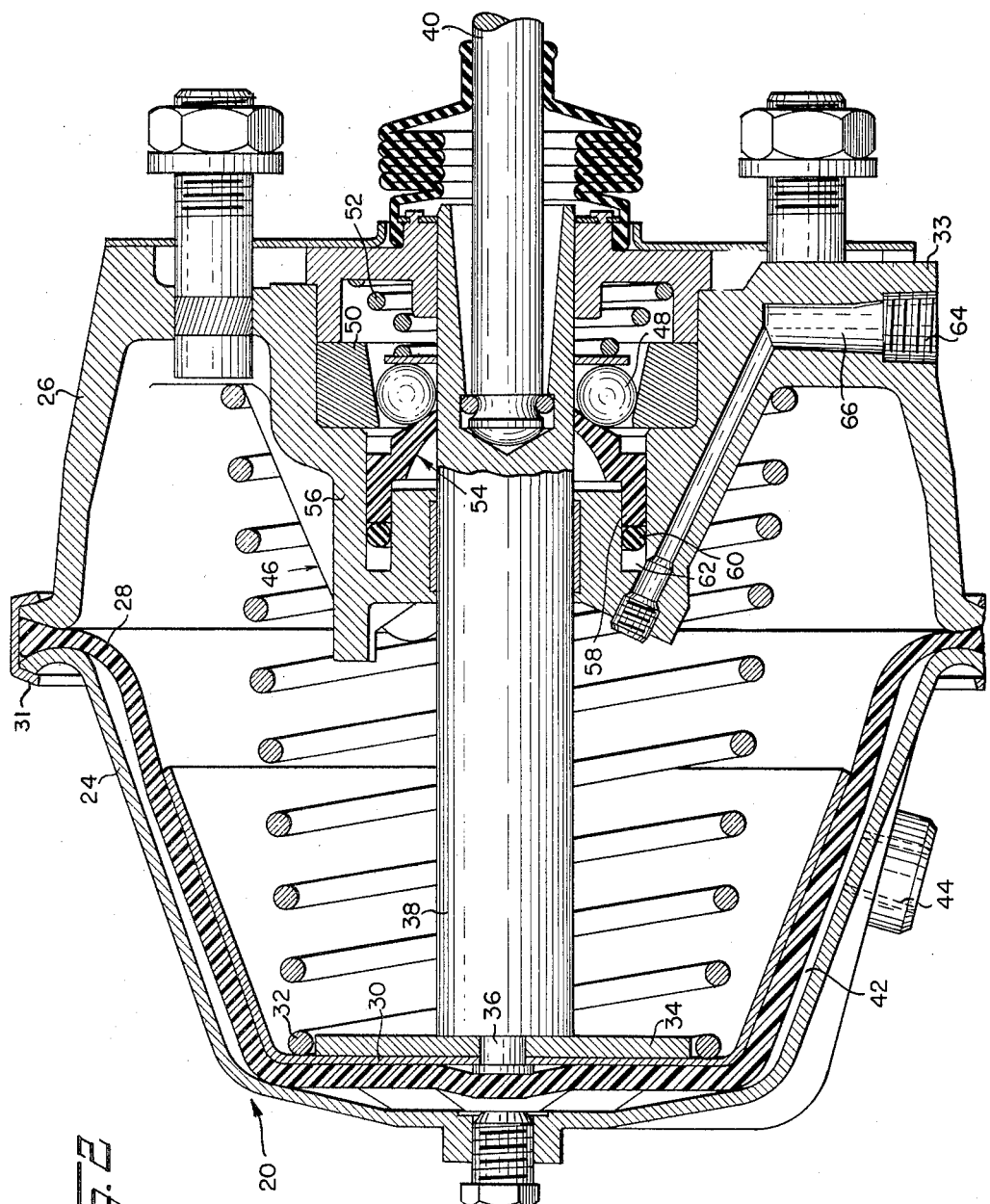

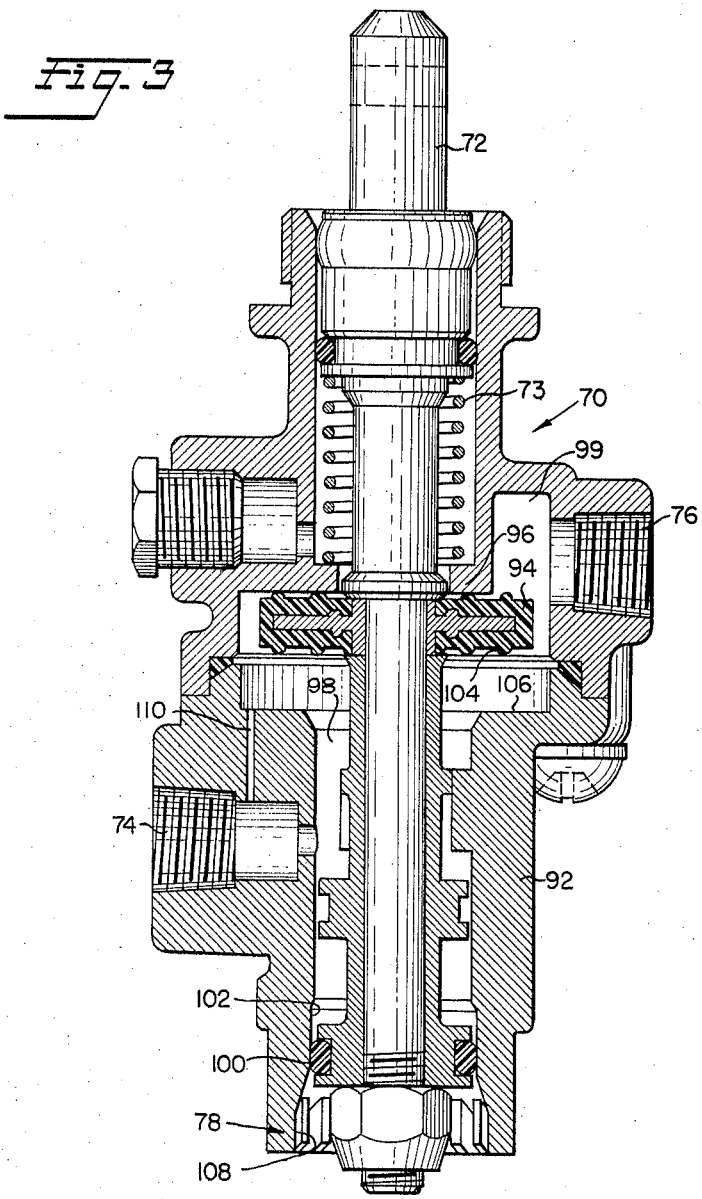

3,240,537
TRAILER BRAKE FLUID SYSTEM INCLUDING
A MECHANICAL LOCK
Harry M. Valentine, Elyria, Ohio, assignor to Bendix-Westinghouse Automotive Air Brake Company, Elyria, Ohio, a corporation of Delaware
Filed Dec. 5, 1963, Ser. No. 328,274
6 Claims. (Cl. 303—29)

This invention relates to brake mechanisms for trailer vehicles and more particularly to a safety and parking brake mechanism for trailers equipped with air brake systems.

Conventional compressed air braking systems for tractor-trailer vehicles are so constructed that when the vehicles are uncoupled, the trailer brakes are automatically applied. Thereafter, should the trailer brake system pressure be lost, due to leakage for example, the trailer brakes will be released, so that some safeguards must be taken to insure that the trailer will remain in its brake-applied or parked position.

The principal object of the present invention is to provide a novel trailer brake system which is so arranged that when the trailer is disconnected from the tractor, the trailer brakes will be automatically applied in the usual manner, such trailer brake application being locked however, in the applied position when the trailer brake system pressure drops to a predetermined pressure. Such a construction will insure that the uncoupled trailer will remain in a parked and safe condition notwithstanding loss of all fluid pressure in the trailer braking system.

Another object is to provide in a system of the above type, a novel trailer brake control system wherein the automatic emergency application of the brakes will occur when there is a break-in-two of the coupled vehicles; and such emergency application will not be locked in applied condition until the trailer brake system pressure drops to a predetermined value.

A further object is to provide a trailer brake system of the foregoing character wherein the automatic emergency application of the trailer brakes may be readily released in order that the uncoupled trailer may be moved for loading or unloading operations.

A still further object is to provide a novel control valve which is incorporated in the trailer brake system and which is effective to control trailer brake operation as well as trailer brake locking operation, the construction being such that with the valve in a first normal position, the brake locking operation is ineffective provided the trailer brake system pressure is above a predetermined pressure, whereas with the valve in a second position, an automatic emergency application of the trailer brakes on an uncoupled trailer may be completely released without the possibility of having a partial brake application maintained in a locked condition.

The above and other objects of the invention will appear more fully hereinafter from a consideration of the following detailed description when taken in connection with the accompanying drawings. It is to be expressly understood however, that the drawings are utilized for purposes of illustration only, and are not designed as a definition of the limits of the invention, reference being had for this latter purpose to the appended claims.

Referring to the drawings, wherein similar reference characters refer to similar parts throughout the several views:

FIG. 1 is a diagrammatic view of a compressed air operated trailer brake system constructed in accordance with the principles of the present invention;

FIG. 2 is a sectional view of one of the trailer brake actuators of FIG. 1, and

FIG. 3 is a sectional view of the novel control valve mechanism.

Referring to FIG. 1, the present invention is illustrated therein in connection with a conventional type of compressed air braking system which includes an emergency conduit 4 which is connected through a relay emergency valve 6 to supply compressed air to a trailer reservoir 8 in the usual manner, when the trailer is connected with the tractor by means of the conventional coupling 10. A service conduit 12 provided with a coupling member 14 for connection with the tractor service conduit, is connected with the relay emergency valve 6 in order to supply compressed air from the reservoir 8 through conduits 16 and 18 to trailer brake actuators 20 and 22. The relay emergency valve 6 is of conventional form and may be constructed as shown in the patent to Charles E. Gates, No. 2,937,052, dated May 17, 1960.

With the above arrangement, when the trailer emergency and service conduits 4 and 12 respectively, are connected with the associated tractor emergency and service conduits (not shown), the trailer reservoir 8 is charged with compressed air through the emergency conduit 4 and the relay emergency valve 6. With the vehicles thus coupled, service application of the trailer brake actuators 20 and 22 is effected by operation of the tractor brake valve and charging of the trailer service conduit 12. The relay emergency valve 6 is then responsive to service conduit pressure in order to graduate the application of compressed air from the trailer reservoir 8 to the trailer brake actuators 20 and 22.

Also, as well understood in the art, should the trailer emergency conduit 4 be disconnected from the tractor emergency conduit, as by means of a break-in-two of the vehicles or by manual uncoupling of the coupling member 10, the relay emergency valve 6 will function to charge the trailer brake actuators 20 and 22 with full reservoir pressure from the trailer reservoir 8 by way of the conduits 16 and 18. Thus, the trailer brakes will be automatically applied. However, if the trailer is parked under such conditions, and the trailer reservoir pressure is lost, due to leakage for example, the trailer brakes will be released. Furthermore, with the conventional system, if it is desired to maneuver the parked trailer, it is necessary to recouple the tractor and trailer in order to recharge the trailer reservoir for the purpose of releasing the trailer brakes.

In the present invention, the conventional trailer brake system above described is so arranged as to provide a novel arrangement which is so constructed and arranged as to overcome the above difficulties.

Referring to FIG. 2, each of the trailer brake actuators includes a pair of casing members 24 and 26 having the peripheral portion of a diaphragm 28 clamped therebetween by a suitable clamping member 31. A cup-shaped member 30 is maintained in engagement with the diaphragm 28 by a spring 32 which is interposed between the member 30 and the end wall 33 of the casing 26. A push-plate 34 is secured at 36 to the member 30 and the latter is connected with a rod 38 which is suitably connected to a brake actuating rod 40. Diaphragm 28 cooperates with the casing member 24 to form a brake chamber 42, the latter being provided with a suitable inlet opening 44 which is connected to the conduit 16 or 18. With such an arrangement, it will readily be understood that as soon as the chamber 42 is charged with compressed air, the diaphragm 28 and brake actuating rod 40 will be moved to the right, as viewed in FIG. 2, for applying the trailer brakes.

The present invention includes a brake locking means 46 for locking the rods 38 and 40 in brake applied position under certain conditions of operation. Such locking means may be constructed as illustrated in the application of Harry M. Valentine, Serial No. 121,970, filed July 5, 1961, now Patent No. 3,173,726, for Brake Mechanism With Mechanical Lock, such application being owned by the same assignee. More particularly, the brake locking means 46 includes a plurality of locking rollers 48 which are interposed between a cam ring 50 and the rod 38 the locking rollers being normally urged into locking position by means of a spring 52. In this position, brake applying movement of the rod 38 to the right may take place. However, any movement to the left, corresponding to brake releasing movement, is prevented since the locking rollers become firmly wedged between the ring 50 and the rod 38 through the action of the spring 52. Thus, after the brake has been applied, the locking rollers 48 prevent brake releasing movement of the rod 38.

Means are provided for maintaining the locking rollers 48 in released position and preferably such means is controlled by fluid pressure. As shown, a fluid pressure control or release means 54 includes a cylinder 56 in which a deformable annular piston 58 of suitable plastic material is housed and positioned between an O-ring seal 60 and the rollers 48, the cylinder including a lock release chamber 62 to which fluid pressure may be conducted by way of a lock port 64 and a duct 66 formed in the end wall 33 of the casing member 26. Thus, when the chamber 62 is charged with fluid pressure of a predetermined magnitude, piston 58 is effective to move the locking rollers 48 to the right against the tension of the spring 52 to relieve the locking effect of the rollers upon the rod 38 and allow movement of the latter in opposite directions for brake application and release. On the other hand, when the chamber 62 is exhausted, or the pressure therein drops to a predetermined magnitude of the order of 40 p.s.i. for example, the spring 52 is effective to move the rollers 48 into locking position and prevent any movement of the rod 38 to the left as above described.

Referring again to FIG. 1, a novel arrangement is utilized by the present invention for controlling the operation of the locking rollers 48. As shown, such means includes a control valve 70 provided with a manually controlled plunger 72, the valve including inlet, outlet and exhaust ports 74, 76 and 78 respectively. The inlet port 74 is connected with the trailer reservoir 8 by means of a conduit 80. Outlet port 76 is connected with the lock ports 64 of the actuators 20 and 22 as by means of a conduit 82, a small volume reservoir 84 and conduits 86 and 88. Exhaust port 78 communicates with the atmosphere.

Valve 70 is more particularly illustrated in FIG. 3 and includes a casing 92 in which the valve plunger 72 is mounted for axial movement in opposite directions. In the position illustrated, the plunger 72 occupies its normal upward position through the action of spring 73, so that valve member 94 is moved upwardly to contact an abutment 96, the valve member 94 thus establishing communication between the inlet port 74 and the outlet port 76 by way of interconnected inlet chamber 98 and outlet chamber 99. It will also be observed that when the valve 70 occupies the normal position shown in FIG. 3, the inlet port 74 is disconnected from the exhaust port 78 by means of an O-ring exhaust valve 100 which is carried by the lower portion of the plunger 72, the O-ring 100 sealingly engaging a bore 102. When the valve control plunger 72 is moved downwardly however, an annular valve part 104 of the valve member 94 engages a valve seat 106 to close communication between the inlet and outlet ports 74 and 76, while the exhaust valve 100 will be moved into an enlarged fluted bore 108 in order to connect the inlet port 74 and inlet chamber 98 with the exhaust port 78.

In the normal operation of the trailer brake system heretofore described, the valve control plunger 72 normally occupies its upper position which serves to connect the inlet port 74 with the outlet port 76. With the tractor and trailer vehicles coupled, fluid pressure will be conducted from the trailer reservoir 8 to the lock release means 54 by way of conduit 80, valve 70, conduit 82, volume reservoir 84 and conduits 86 and 88. Thus, during normal operation of the coupled vehicles, the locking rollers 48 will be maintained in unlocked condition and service application of the actuators 20 and 22 may be effected in the usual manner by charging the service conduit 12 by operation of the tractor brake valve.

In the event the trailer is uncoupled from the tractor, it will be understood that an emergency application of the trailer actuators 20 and 22 will occur by reason of the conventional operation of the relay emergency valve 6. However, due to the charging of the lock release means 54 of the actuators, due to the open position of the valve 70, the trailer brake actuators will not be held in locked condition. Thus, the trailer brakes will be automatically applied in the usual manner whether the vehicles are manually uncoupled or whether there is a break-in-two.

Assuming that the trailer is uncoupled from the tractor and that the trailer brakes are applied as above stated, in the event that the trailer system pressure drops to approximately 40 p.s.i. for example, the brake locking means 46 will be effective through the action of the spring 52 to lock the rod 38 in its brake applied position. In this instance, the pressure in the trailer brake actuators will drop at substantially the same rate as the pressure in the brake locking means so that when the latter become effective, a brake application of approximately 40 p.s.i. will be locked in applied position. Thus, an automatic parking of the trailer will be secured as soon as the trailer brake system pressure drops to substantially the aforementioned value.

In the event that the trailer brakes are automatically applied, as above stated, and it is desired to release the brake application, it is only necessary to move the plunger 72 of the valve 70 to its lower position to close the valve 94 upon its seat 106. At the same time, trailer reservoir 8 is connected directly to atmosphere through the open exhaust port 78 by way of conduit 80, inlet port 74 and open exhaust valve 100. After approximately two seconds, the pressure within the chamber 98 acting upon the lower surface of closed valve 94 will drop sufficiently so that the pressure acting on the upper surface of the valve 94 will maintain the valve closed. As the pressure in the trailer reservoir 8 is depleted, it will be understood that the pressure within the actuators 20 and 22 will also be exhausted to atmosphere through the relay emergency valve 6 and the reservoir 8. Thus, the trailer brake application may be released without the necessity of recoupling the trailer with the tractor.

One of the important features of the invention resides in constructing the valve 70 in such a manner that the latter is automatically returned to the normal position of FIG. 3 after the valve has been operated to release a trailer brake application as just described. Referring to FIG. 3, it will be noted that a small choke port 110 is provided in the valve casing and is so positioned that chamber 99 is connected with the inlet port 74 even though the valve 94 is closed upon the valve seat 106. Thus, when the plunger 72 is moved to its lower position, as above described, the fluid from the lock release means 54 is gradually fed to the exhaust port 78 by way of conduits 86 and 88, reservoir 84, conduit 82, choke port 110 and open exhaust valve 100, and hence the fluid pressure acting upon the upper surface of the closed valve 94 will be gradually reduced. As soon as such fluid pressure has dropped to approximately 20 p.s.i., the spring 73 will automatically return the valve to the normal position of FIG. 3 so that when the vehicles are recoupled, the lock release means 54 will be charged with fluid pressure as soon as the trailer brake system pressure is restored. It will be understood that the choke port is of such size that it will not permit the pressure in the lock release means 54 to drop to a value where the locking means 46 becomes effective before the brake application is completely released. Thus, even though the locking means 54 becomes effective at 40 p.s.i., the trailer brakes will be in released condition.

When the valve 70 returns to its normal position it will be noted that the conduit 82 will be connected with the reservoir 8 by way of outlet port 76, interconnected chambers 99 and 98, inlet port 74 and conduit 80. Thus, the small reservoir 84 will be in communication with the trailer reservoir 8. However, due to the relatively large size of the latter reservoir as compared to the reservoir 84, the relatively low pressure of 20 p.s.i. will be insufficient to reapply the trailer brake actuators.

It will be noted that as the plunger 72 of the valve 70 is moved to its lower position, the outlet port 76 as well as the connections to the lock release means 54 are momentarily connected with the exhaust port 78 due to the opening of the exhaust valve 100 prior to seating of the valve member 94 upon its seat 106. This momentary connection might release sufficient pressure from the lock release means so that the magnitude of the pressure remaining in the lock release chamber 62 might be such that the locking rollers would be effective to lock a partial application of the brakes. This contingency is avoided by the use of the volume reservoir 84 which insures that sufficient pressure will remain in the chamber 62 as to maintain the brake locking means 46 in released condition as the plunger 72 is moved downwardly. Thus, the brake application on the trailer may be completely released by merely moving the valve control plunger 72 to its lower position.

From the foregoing, it will be readily understood that the present invention provides a novel safety and parking brake construction for trailers which is effective to lock the trailer brakes in applied condition in the event that the trailer is uncoupled from the tractor and the trailer reservoir pressure drops to a predetermind value. Even though the invention includes a brake locking construction, the arrangement is nevertheless such, that the locking device will not interfere in any way with the conventional automatic trailer brake application when the trailer is uncoupled from the tractor.

A further feature comprises the use of the control valve and system arrangement including the volume reservoir, which enables a trailer brake application to be readily released without danger of the trailer brakes becoming locked in a partially applied condition. The invention is moreover such that the system is automatically restored to its normal condition without any attention on the part of the operator, this being achieved by the use of the return spring 73 in the control valve and the choke port 110. Thus, when the vehicles are recoupled, the brake locking mechanism is automatically released as soon as the trailer reservoir pressure builds up to a value sufficient to charge the lock release mechanism to a value of the order of 60 p.s.i.

While a preferred embodiment of the invention has been shown and described herein with considerable particularity, it will be readily understood by those skilled in the art that various modifications may be resorted to without departing from the spirit of the invention. Reference will therefore be had to the appended claims for a definition of the limits of the invention.

What is claimed is:

1. In a fluid pressure safety brake system for a trailer of the type having a brake actuator for applying a trailer brake, a relay emergency valve and a fluid pressure reservoir chargeable with fluid under pressure through an emergency line when the latter is connected with a tractor and operative to charge the brake actuator with fluid under pressure to apply the trailer brake when the emergency line is disconnected from the tractor, spring applied brake locking means for locking said actuator in brake applied position when the pressure in said reservoir drops to a predetermined value, fluid pressure operated release means for maintaining said locking means in released condition when the pressure in said reservoir is above said predetermined value, and means for controlling said release means and for releasing the trailer brake comprising valve means having a casing provided with a valve element supported therein, said element being movable from a first position in which the reservoir is connected with the release means to maintain the locking means in released condition when the pressure in said reservoir is above said predetermined value to a second position in which the reservoir is connected directly with the atmosphere to release the brake when the emergency line is disconnected from the tractor, means affording a restricted connection between the release means and the atmosphere when said valve element occupies said second position, and means for automatically moving said valve element to said first position when the pressure in said release means drops to a predetermined value.

2. In a fluid pressure safety brake system for a trailer of the type having a brake actuator for applying a trailer brake, a relay emergency valve and a fluid pressure reservoir chargeable with fluid under pressure through an emergency line when the latter is connected with a tractor and operative to charge the brake actuator with fluid under pressure to apply the trailer brake when the emergency line is disconnected from the tractor, spring applied brake locking means for locking said actuator in brake applied position when the pressure in said reservoir drops to a predetermined value, fluid pressure operated release means for maintaining said locking means in released condition when the pressure in said reservoir is above said predetermined value, and means for controlling said release means and for releasing the trailer brake comprising valve means having a casing provided with inlet and outlet ports adapted for respective connection with said reservoir and said release means and provided also with an exhaust port connected with the atmosphere, a valve element movable in said casing from a first position in which the inlet and outlet ports are connected to charge the release means to a second position in which the inlet and exhaust ports are connected to place the reservoir in communication with the atmosphere to release the brake, spring means normally urging said valve element to said first position, and means affording a restricted communication between said release means and said exhaust port when said valve element is moved to said second position.

3. In a fluid pressure safety brake system for a trailer of the type having a brake actuator for applying a trailer brake, a relay emergency valve and a fluid pressure reservoir chargeable with fluid under pressure through an emergency line when the latter is connected with a tractor and operative to charge the brake actuator with fluid under pressure to apply the trailer brake when the emergency line is disconnected from the tractor, spring applied brake locking means for locking said actuator in brake applied position when the pressure in said reservoir drops to a predetermined value, fluid pressure operated release means for maintaining said locking means in released condition when the pressure in said reservoir is above said predetermined value, and means for controlling said release means and for releasing the trailer brake comprising valve means having a casing provided with inlet and outlet ports adapted for respective connection with said reservoir and said release means and provided also with an exhaust port connected with the atmosphere, a valve element movable in said casing from a first position in which the inlet and outlet ports are connected to charge the release means to a second position in which the inlet and exhaust ports are connected to place the reservoir in communication with the atmosphere to release the brake, said valve element including a part subjected to the pressure in said release means for maintaining said element in said second position, means affording a restricted communication between said release means and said exhaust port when the valve element is moved to said second position, and means for automatically said valve element to said first position when the pressure in said release means drops to a predetermined value.

4. A fluid pressure safety brake system as set forth in claim 3 wherein the last named means comprises a spring interposed between said valve element and said casing.

5. A fluid pressure control valve having a casing provided with inlet, outlet and exhaust ports, a valve element movable within the casing from a first position in which said inlet and outlet ports are directly connected and said exhaust port is isolated therefrom to a second position in which said inlet and exhaust ports are directly connected, means affording a restricted communication between said outlet port and said inlet port when the valve element is moved to said second position, resilient means normally acting to urge said valve element to said first position, manually operable means for moving said valve element to said second position against the action of said resilient means, and a pressure responsive element carried by said valve element having opposite sides subjected to pressures at said inlet and outlet ports when said valve element is moved to said second position, said valve element being automatically returned to said first position by said resilient means in response to a decrease in pressure at said outlet port.

6. In a fluid pressure safety brake system for a trailer of the type having a brake actuator for applying a trailer brake, a relay emergency valve and a fluid pressure reservoir chargeable with fluid under pressure through an emergency line when the latter is connected with a tractor and operative to charge the brake actuator with fluid under pressure to apply the trailer brake when the emergency line is disconnected from the tractor, spring applied brake locking means for locking said actuator in brake applied position when the pressure in said reservoir drops to a predetermined value, fluid pressure operated release means for maintaining said locking means in released condition when the pressure in said reservoir is above said predetermined value, and means for controlling said release means and for releasing the trailer brake comprising valve means having a casing provided with a valve element supported therein, said element being movable from a first position in which the reservoir is connected with the release means to maintain the locking means in released condition when the pressure in said reservoir is above said predetermined value to a second position in which the reservoir is connected directly with the atmosphere to release the brake when the emergency line is disconnected from the tractor, said valve means including a spring constantly urging said valve element toward said first position.

No references cited.

EUGENE G. BOTZ, *Primary Examiner.*